United States Patent
Wong

(10) Patent No.: US 6,430,516 B1
(45) Date of Patent: Aug. 6, 2002

(54) HIGH SPEED ROTATING SHAFTS AND METHODS OF CHARACTERIZING SAME

(75) Inventor: Po Kee Wong, 50 Bradley St., Somerville, MA (US) 02145

(73) Assignee: Po Kee Wong, Somerville, MA (US)

( * ) Notice: Subject to any disclaimer, the term of this patent is extended or adjusted under 35 U.S.C. 154(b) by 0 days.

(21) Appl. No.: 08/951,996

(22) Filed: Oct. 16, 1997

Related U.S. Application Data

(63) Continuation of application No. 07/145,553, filed on Jan. 19, 1998, now abandoned, and a continuation of application No. 08/132,886, filed on Oct. 7, 1993, now abandoned.

(51) Int. Cl.$^7$ ................................................ G05B 1/06
(52) U.S. Cl. ...................................... 702/56; 324/166
(58) Field of Search ............................ 702/56; 324/97, 324/166, 207.17; 359/109, 155; 318/16, 540, 480

(56) References Cited

PUBLICATIONS

Wong et al., Propigation of Harmonic Flexural Waves in an Infinite Elastic Rod of Elliptical Cross Section, H. Acoustical Society of Am., vol. 40, No. 2 (Aug. 1966).
Gazis, D. C., Three–Dimensional Investigation of the Propagation of Waves in Hollow Circular Cylinders I: Analytical Foundation, and II: Numerical Results, *Jr. Ac. Soc. Amer.*, vol. 31, pp. 568–578, 1959.
Greenspon, J.E., "Vibration of a Thick–walled Cylindrical Shell—Comparison of the Exact Theory with Approximate Theories", *Jr. Ac. Soc. Amer.*, vol. 32, pp. 571–578, 1960.
Wong, P. K., "On the Unified General Solution of Linear Wave Motions of Thermolastodynamics and Hydrodynamics with Practical Examples." Transaction of ASME, Journal of Applied Mechanics, vol. 34, pp. 879–887, Dec. 1967 and vol. 35, pp 847, Dec. 1968.
Wong, P.K., "Waves in Viscous Fluids, Elastic Solids, and Viscoelastic Materials." Ph.D. Dissertation, Department of Aeronautics and Astronautics, Stanford University, Stanford, California, U.S.A., 1970.
Wong, P.K., "On the Irrotational–Flow Velocity Potential Function and a New Stream Function of Fluid Mechanics." Preprint Paper No. 80–C2/Aero–3, ASME Century 2 Aerospace Conference, San Francisco, California, U.S.A. Aug. 13–15, 1980.

*Primary Examiner*—Kamini Shah

(57) ABSTRACT

The invention concerns the design methodology for high speed rotating shafts based on the wave spectrum analysis of the vibrational modes of elastic circular rods and shells. In accord with the invention, a shaft is designed by (1) selecting the material of the shaft; (2) determining dilational wave speed of the material as a function of frequency; (3) determining shear wave speed of the material as a function of frequency; (4) solving for critical frequencies of the shaft by solving a three-dimensional characteristic frequency equation for the shaft, the equation being defined by the dilational wave speed, the shear wave speed, and the inner and outer radius of the shell, the critical frequencies defining functions that depend upon physical dimensions of the inner and outer radius; and (5) specifying the inner and outer radius of the shell by minimizing cross-over of critical frequencies over operational rotational speeds of the shaft. A similar technique solves for shaft dimensions with an inner material within the shaft.

5 Claims, 5 Drawing Sheets

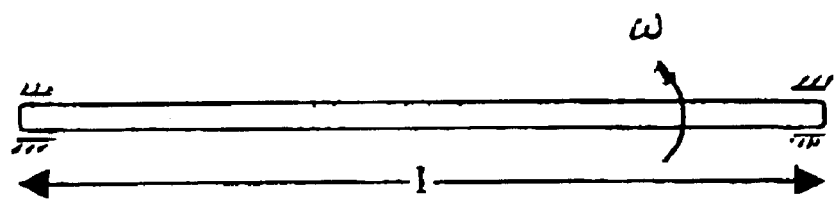
Figure No. 1
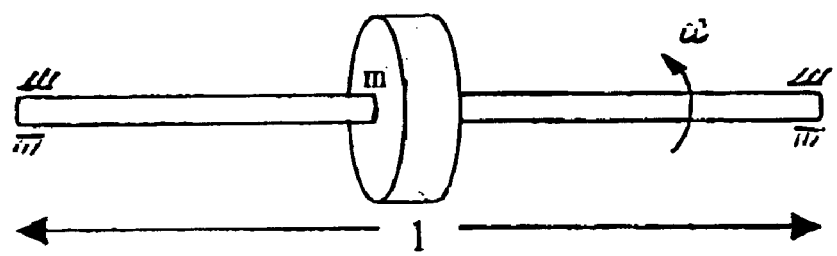
Figure No. 2
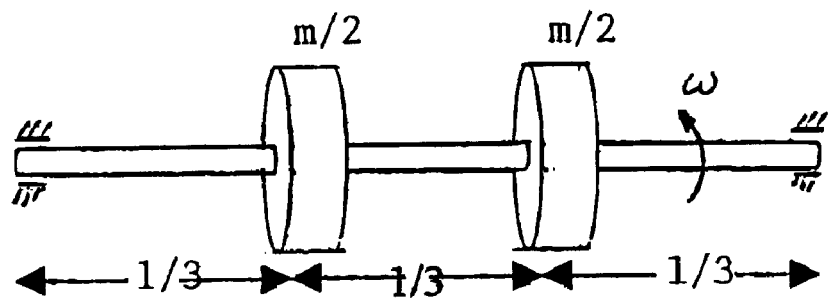
Figure No. 3

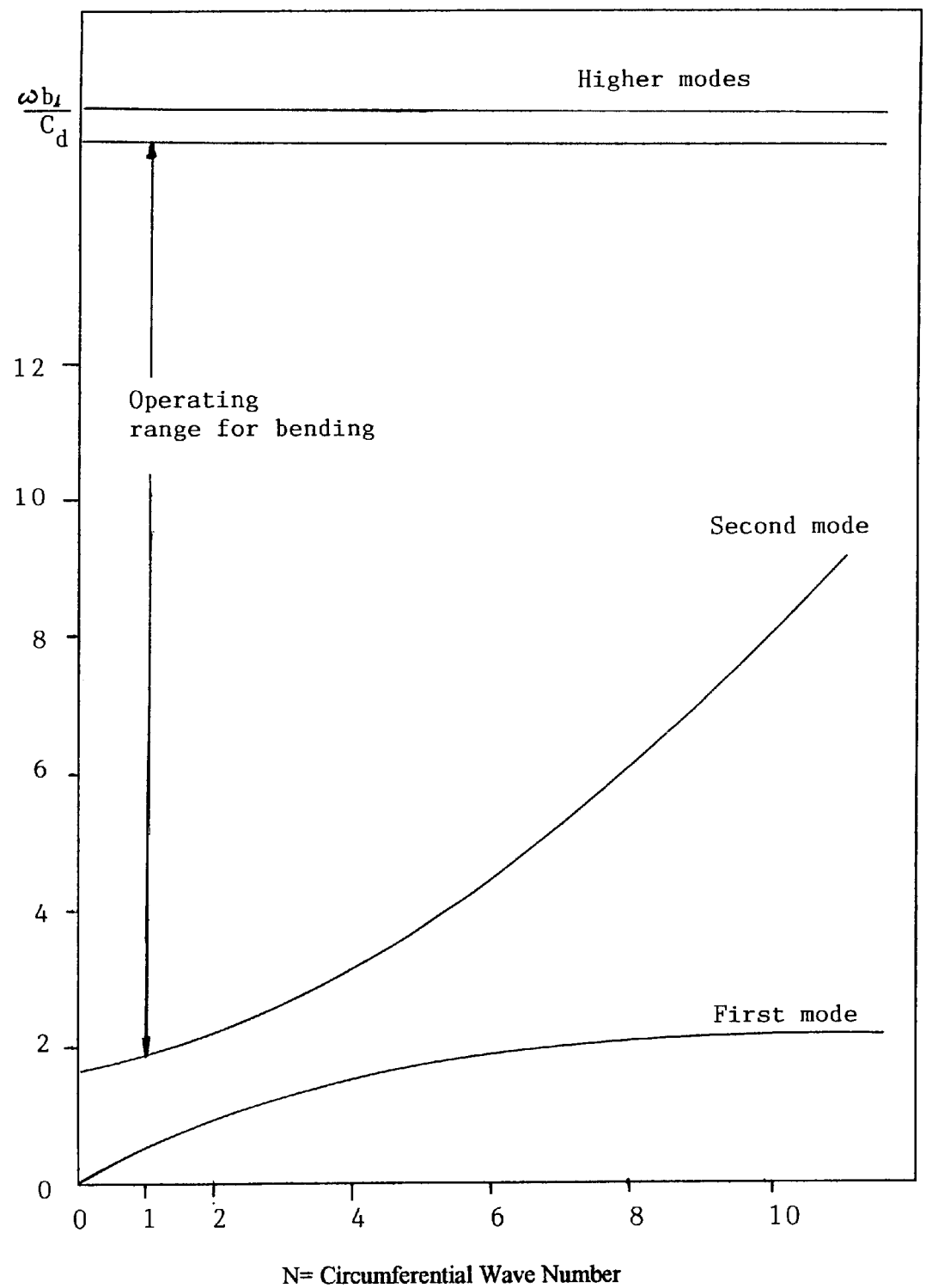
Figure No.4

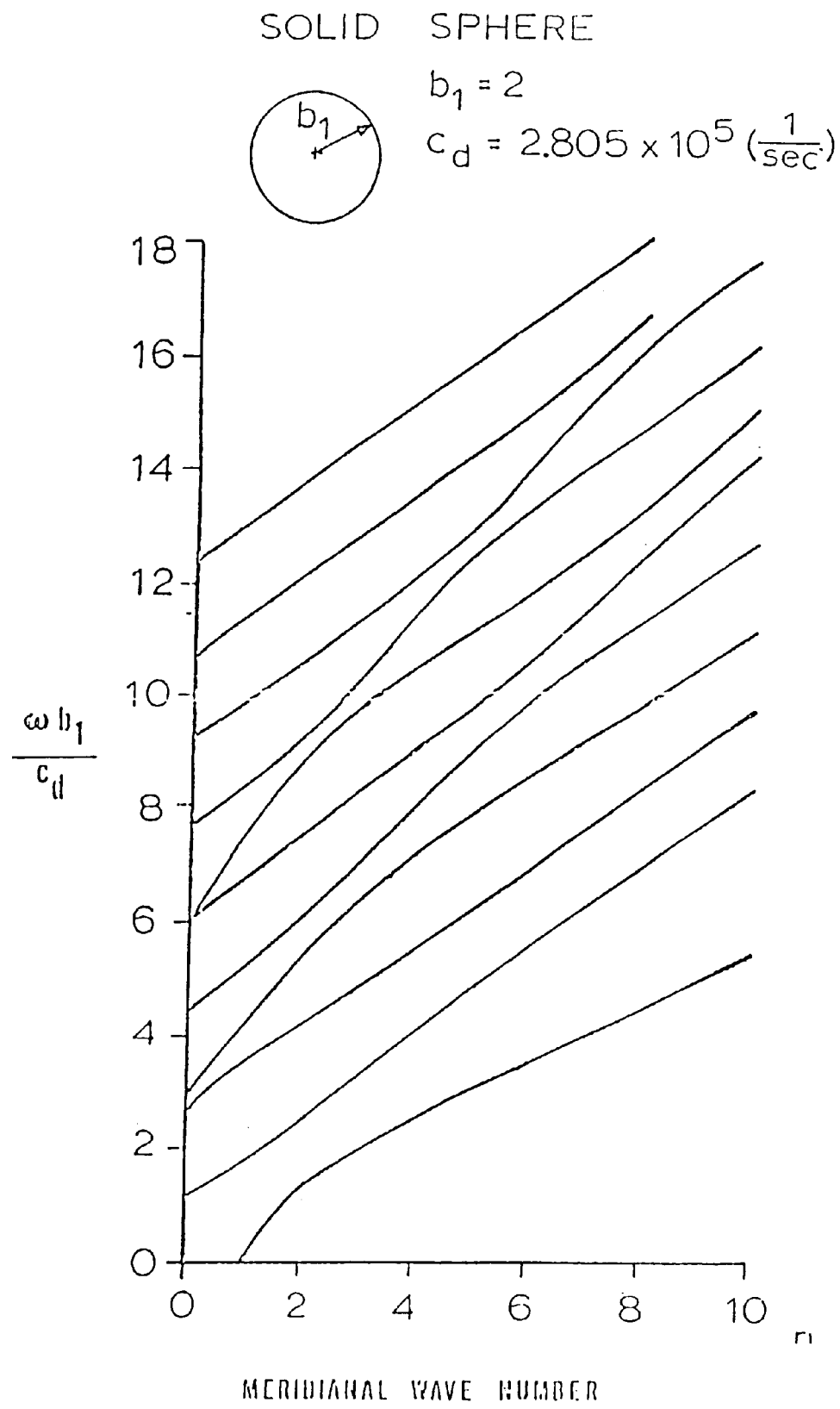
Figure No.5

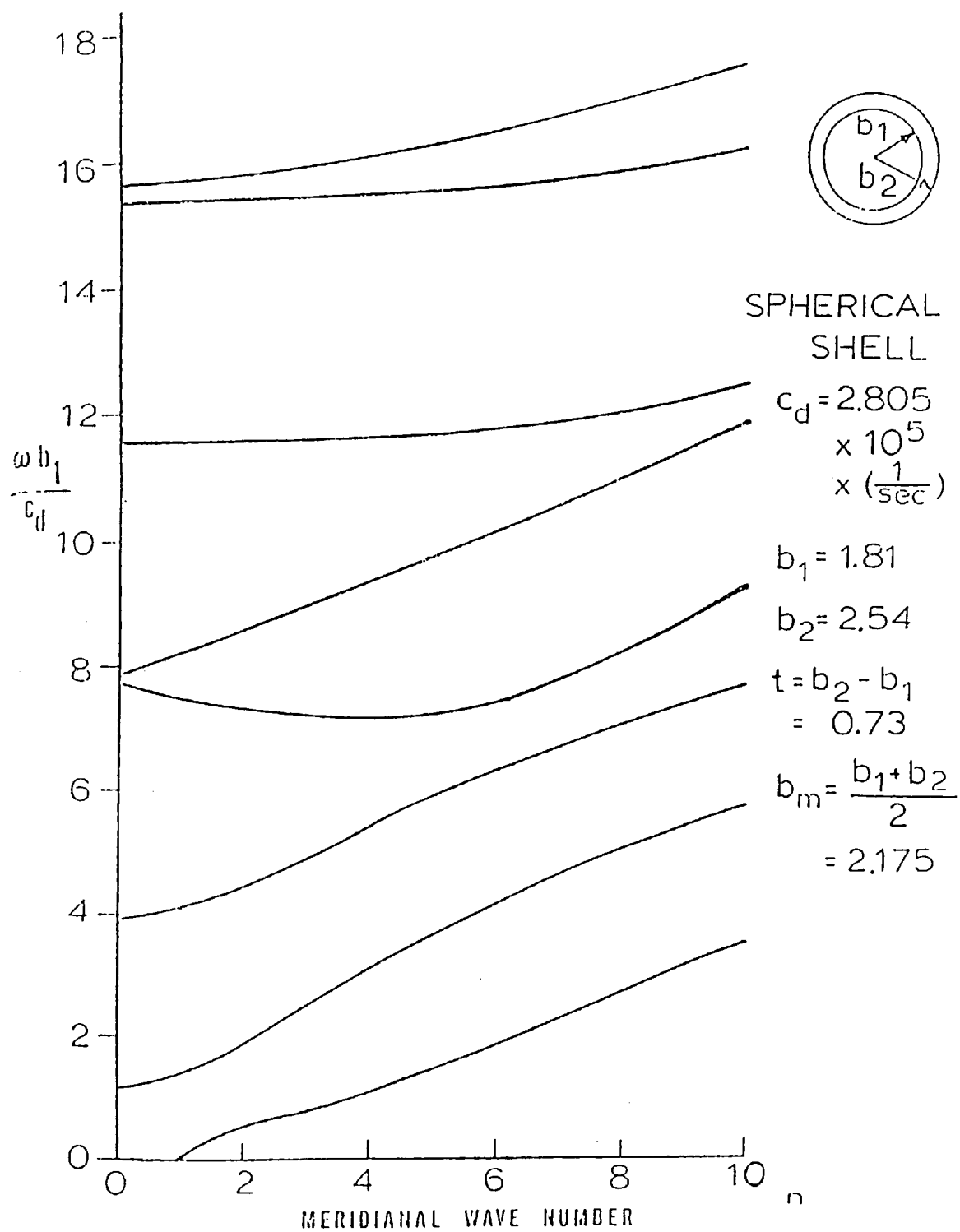
Figure No.6

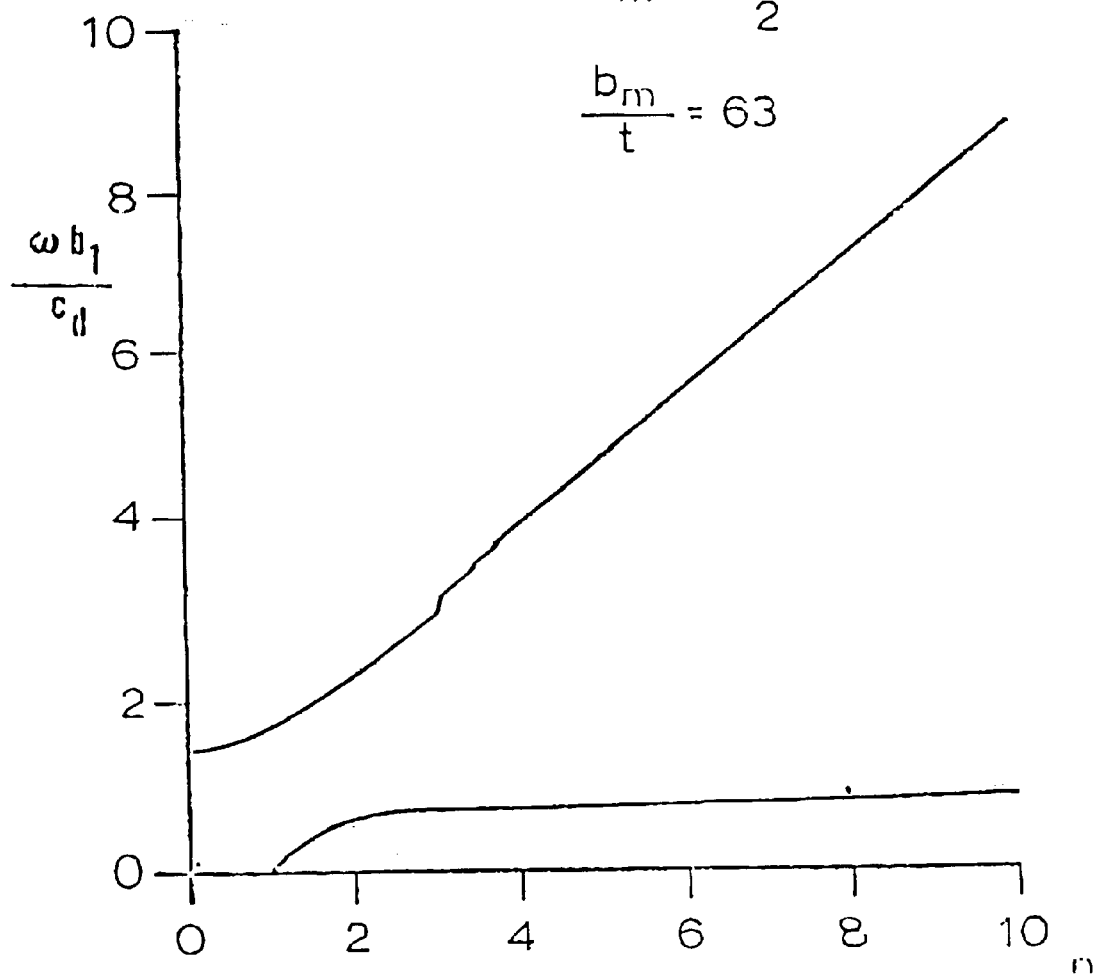
Figure No. 7

HIGH SPEED ROTATING SHAFTS AND METHODS OF CHARACTERIZING SAME

This application is a continuation of U.S. application Ser. No. 07/145,553, filed on Jan. 19, 1988, and now abandoned, and of commonly-owned and U.S. application Ser. No. 08/132,886, filed on Oct. 7, 1993 now abandoned.

FIELD OF THE INVENTION

The present invention provides: (1) The exact characteristic equation of vibrations of a circular cylindrical shell; (2) The characteristic equation is good for any linear viscoelastic materials including elastic solids and non-Newtonian fluids; (3) Computer programs to generate data for the vibrational wave spectrum analysis; (4) The physical and geometrical dimensions of the shafts can be determined between two critical frequencies.

BACKGROUND OF THE INVENTION

High speed rotating shafts are one of the most important parts of machines that are used for the transformation of other energies into kinetic energy. They are used in turbines, rotors, motors, pumps and flywheels that are the most vital components of space shuttles, jetliners, and all other vehicles operated in space, air, land and in hydrospace. Thus far, the design of low and moderate speed rotating shafts has been very well known and successfully applied and used in our daily machines. However, because of the need for higher performance of the machines in our modem times, special care must be given to design high speed rotating shafts. The mechanical structural failure of the shaft may lead to a disaster of losing human lives in airplanes because fragments of the broken shaft carry high kinetic energy that could destroy airplane components in their paths. If this is allowed to happen, the airplane will be shattered into pieces.

To solve the problem, two aspects have been followed: one by means of experimental tests; the other by means of theoretical analysis. They are complimentary to each other. The former provides a practical solution of the problem. It is more expensive than using the latter on account of the choices of physical and geometrical parameters of various modem materials of the shafts for different purposes. The latter provides a systematic guide for the tests to choose the appropriate material for the shaft once the analysis is completed and perfected with a fully developed computing program.

From the theoretical aspect, the proposed solution of the problem has been attempted by means of three methods: 1. particle dynamics; 2. structural dynamics; and 3. elastodynamics. Historically, the particle dynamics approach to solve the rotary dynamic problems can be traced back to two papers in 1895 by Dunkerly, S., "On the Whirling and Vibration of Shafts," Phil. Trans. Roy Soc. A., Vol. 185, pp. 269–360, and by Foppl, A., "Das Problem der Laval'schen Turbinewlle," Civilinggenieur 41, pp. 332–342. The interests of those problems have been extended and continued by many others in the academic and industrial organizations. Most recently, the paper by Crandall, S. H., "The Physical Nature of Rotor Instability Mechanisms" in "Rotor Dynamical Instability" (M. L. Adams, ed.) ASME Special Publication, AMD-Vol. 55, pp. 1–18 (1983), provided simple physical explanations of several instability mechanisms. They are whirling due to Coriolis acceleration; internal damping in the rotor; flow about the rotor; and internal flow within a rotor. It is well known that the dynamics of particles approach involves the vibration of masses between springs. Similarly, the vibration of continuous structures are also usual topics in the field of structural mechanics. A combination of both, and the efforts of many as indicated by the many papers by Myklestad, N.O., "A New Method of Calculating Natural Modes of Uncoupled Bending Vibration of Airplane Wings and Other Types of Beams" J. Aero. Sci., pp.153–162 (April 1944), Prohl, M. A., "A General Method for Calculating Critical Speeds of Flexible Rotors." Trans. ASME A-142 (September 1945), Pestel, E. C., and Leckie, F. A., "Matrix Methods in Elastodynamics" McGraw-Hill, N.Y. (1963) and by Thomson, W. T., "Matrix Solution for the Vibration of Nonuniform Beams." J. Appl'd Mech., pp.337–339 (September 1950) and "Vibration Theory and Application," Prentice-Hall, Englewood Cliff, N.J. (1965), brings about a method to solve many complicated structural problems.

The most important element of the structural dynamics approach is the transfer matrix of the structural system. As can be seen from the books by Thomson and by Pestel and Leckie, the transfer matrix can be derived from the governing differential equations of a physical problem. A great deal of these have been done for the beam theories on torsional, axially compressional and transversal vibrations. However, the transfer matrix for the exact theory of elastodynamics and thermoelastodynamics is comparatively unknown. This was so because general solutions of the governing equations of elastodynamics were either too tedious or uninformative for any practical uses. One of these examples is the well known Pochhammer and Love solution of the flexural vibration of an elastic rod. See, Pochhammer, L., "Ueber die Fortflanzungsgeschwindigkeiten Schwinggungen in ein Unbegrenzten Isotropen Kreiszylinder" J. Fur Math., Vol. 81, pp. 324–336 (1876), and Love A. E. H., "A Treatise on the Mathematical Theory of Elasticity" Cambridge University Press, Fourth Edition, pp. 287–292 (1927). The solution was originated by Pochhammer in 1876 and made independently by Chree in 1886. The original Pochhammer-Chree solution of the problem was very tedious. Concise and modem systematic solution of the same problem together with the wave spectra analysis were separately provided by Gazis in 1959, Gazis, D. C., "Three-Dimensional Investigation of the Propagation of Waves in Hollow Circular Cylinders I: Analytical Foundation, and II: Numerical Results, J. Ac. Soc. Amer., Vol 31, pp. 568–578, by Greenspon in 1960, Greenspon, J. E., "Vibration of a Thick-walled Cylindrical Shell—Comparison of the Exact Theory with Approximate Theories.", J. Ac. Soc. Amer., Vol 32, pp. 571–578, and by Wong in 1967, Wong, P. K., "On the Unified General Solution of Linear Wave Motions of Thermoelastodynamics and Hydrodynamics with Practical Examples" Transaction of ASME, Journal of Applied Mechanics, Vol 34, pp. 879–887 (December 1967) and Vol. 35, pp 847 (December 1968). The wave spectra were extended for the entire class of linear viscoelastic materials for solids and shells by Wong in 1970, Wong, P. K., "Waves in Viscous Fluids, Elastic Solids, and Viscoelastic Materials" Ph.D. Dissertation, Department of Aeronautics and Astronautics, Stanford University, Stanford, Calif. (1970).

SUMMARY OF THE INVENTION

The invention is based upon elastodynamnic methods; and certain details can be traced from Wong, P. K., "On the Unified General Solution of Linear Wave Motions of Thermoelastodynamics and Hydrodynamics with Practical Examples." Transaction of ASME, Journal of Applied Mechanics, Vol 34, pp. 879–887 (December 1967) and Vol. 35, pp 847 (December 1968).

The invention illustrates two main features different from other approaches to solve the design of high speed rotating shafts: (1) since the general solutions of the governing equations of elastodynamics and thermoelastodynamics are shown by Wong in 1967, 1968 and 1970, the derivation of transfer matrices for the exact theories is therefore possible; and (2) it can be shown that the solutions are also useful for practical design purposes. These can be demonstrated in a practical example which can be solved both from the lumped mass technique and from the elastodynamics theory.

It is known that the lumped mass technique is a combination of particle dynamics and structural mechanics approaches. The comparison of lumped mass techniques with elastodynamics is discussed below and in connection with accompanying FIGS. 1–3. Consider, for example, an elastic solid rotating shaft of mass m, density $\delta$, Young's modulus E and area moment of inertia $I=\pi r^4/4$. The shaft is simply supported by two bearings as shown in FIG. 1 for a homogeneous circular cylindrical rotating rod and its equivalence being replaced by a massless shaft with its equivalent mass $m=\pi r^2 l\delta$ concentrating at the center of the rod as shown in FIG. 2. The natural frequency of transversal vibration of the system in FIG. No. 2 can be obtained from the vibrational theory of lumped massed technique:

$$\omega_n = \sqrt{\frac{k}{m}} = \sqrt{48 EI/ml^3} \tag{1}$$

Now let the mass m be that of the shaft itself, the natural frequency of transversal vibration of a rotating homogeneous circular rod shown by FIG. 1 can be expressed as $$\omega_n = \sqrt{48 EI/\pi r^2 \delta l^4} = 2\sqrt{3}\left(\frac{r}{l^2}\right)\sqrt{\frac{E}{\delta}} \tag{2}$$

To compare the result from equation (2) with the natural frequencies obtained from the exact theory of elastodynamics for a circular rod in transversal vibration, one shall find that this is possibly close to the first natural frequency. The question is what about the second and the subsequent higher critical frequencies that are obtained from the exact theory. In order to obtain both the first and the second critical frequencies of the system, one may have to consider the problem represented as shown in FIG. 3. Obviously, in order to get the third frequency, one must divide the shafts into three equal masses each of which is m/3 at an equal interval of l/4 apart. Continuing this process as many times as possible, the ultimate result will be close to those from the exact theory. One may observe that the increase of the number of redistributed masses m will increase the number of critical frequencies. The characteristic equation (critical frequency equation or natural frequency equation of the system) obtained from this approach is a high degree algebraic equation, while the characteristic equation obtained from the exact theory for the same system is a transcendental equation.

Based upon the above reasoning, the accuracy of the lumped mass technique compared with the exact theory to obtain the critical frequencies for a vibrational systems depends upon the number of masses input and also upon how much resemblance of the real system, being replaced by springs and beams, to the remodeled system. Many rotary dynamics computing programs being used in industries were written from the principle of transfer matrix for beam theory including the effects of shear deflection and rotary inertia and with masses and springs attached. They are good for calculating the low critical frequencies. Their advantages over using the exact theory of elastodynamics are: (1) Those computer programs can be applied for analysis of nonuniform beams and shells, whereas the exact theory can be applied to uniform cylinders and shells only before the transfer matrix of the exact theory is fully developed; and (2) Even if the transfer matrix method of the exact theory is fully developed to handle beams of nonuniform cross-sections, the computation is still easier for the approximate theory because the former involves transcendental functions in the characteristic equation, while the latter, involves only algebraic functions in the characteristic equation. The disadvantage is that the critical frequencies obtained by theories other than the exact elastodynamics theory could be far from the exact values. Thus, concrete, systematic and precise wave spectra cannot be concluded so reliable as compared to the results from the exact theory. The wave spectra formed by connecting the critical frequencies of the entire vibrating system is the foundation to set the criterion for the design of rotating shafts. This leads to the need to find the characteristic equation for a vibrating shaft from the elastodynamics theory.

The invention provides computer programs and data for the design of high speed rotating shafts of elastic materials. The invention provides computer programs and data for the design of both high and low speed rotating shafts of linear viscoelastic materials. The invention provides computer programs and data for the design of fuel pins and the structure of the nuclear reactor cores. The invention provides computer programs and data for the design of composite structures in aerospace vehicles, hydro space vehicles and geophysical structures. The invention provides computer programs and data for the design of wide-band frequency spherical and circular cylindrical antennae. The invention provides computer programs and data for the design of hydraulic structural systems. The invention provides computer programs and data for the design of geo-thermal-mechanical structural systems. The invention provides computer programs and data for the design of the structures of coaxial cables. The invention provides computer programs and data for the design of biomechanical structural systems. The invention provides the general solutions of linear wave motions of the entire class of linear viscoelastic materials in viscoelastodynamics, thermoelastodynamics and hydrodynamics.

BRIEF DESCRIPTION OF THE DRAWINGS

FIG. 1 shows a shaft of radius r being supported by two bearings at both end, the length of the shaft between bearings is l, the shaft is rotating at an angular speed of $\omega$ radian per unit time.

FIG. 2 shows the entire mass of the shaft of FIG. 1 lumped at the center of the shaft.

FIG. 3 shows the shaft mass of FIG. 1 lumped into two masses each of which is half the mass of the shaft with a distance of l/3 apart from each other and from both bearings at the ends.

FIG. 4 shows the frequency spectra of an elastic thin shell.

FIGS. 5, 6, 7 present plots of frequency spectra for a solid sphere, a thin spherical shell, and a moderate thick spherical shell.

DETAILED DESCRIPTION OF THE INVENTION

With reference to FIG. 4, the abscissa is denoted by n which represents the circumferential wave number of the circular cylindrical shell: when n=0 it means either an axially symmetric torsional mode or an axially symmetric nontorsional mode which can be obtained from the roots of distinct characteristic equations involving Bessel's functions of zero order; when n=1, it means that the shaft is in transversal motion (the circular shell is maintained as a circle but it is displaced off from the center line between two bearings, some engineers call it the bending mode); when n is an integer greater than 1 i.e. n=2,3,4,5 . . . , it means that the shaft is in circumferential motion. According to the practical test from the experiments, the high speed rotating shafts are often broken under the transversal (bending) mode.

The ordinate presents a normalized vibrational frequency $\omega b_I/c_d$ where $\omega$ is the angular speed of the shaft; $b_I$ is the inner radius of the shell; and $c_d$ is the dilatational wave speed of the material of the circular cylindrical shell.

When the shell is thin, the critical frequency of the higher modes is far from the critical frequency of the second mode, thus the rotating shaft should run in the range as indicated in the FIG. 4 to assure the maximum safety of the rotating shaft and provide a wide range of mobility of safety for the machines.

The detailed description of the invention is supported with reference to the following papers: Wong, Po Kee, "FUNDAMENTAL CONCEPTS FOR THE DESIGN OF HIGH SPEED ROTATING SHAFTS" (unpublished), Wong, P. K., "On the Unified General Solution of Linear Wave Motions of Thermoelastodynamics and Hydrodynamics with Practical Examples." Transaction of ASME, Journal of Applied Mechanics, Vol 34, pp. 879–887 (December 1967) and Vol. 35, pp 847 (December 1968), Wong, P. K., "Waves in Viscous Fluids, Elastic Solids, and Viscoelastic Materials." Ph.D. Dissertation, Department of Aeronautics and Astronautics, Stanford University, Stanford, Calif. (1970); and Wong, P. K., "On the Irrotational-Flow Velocity Potential Function and a New Stream Function of Fluid Mechanics." Preprint Paper No. 80-C2/Aero-3, ASME Century 2 Aerospace Conference, San Francisco, Calif. (Aug. 13–15, 1980), each of which is submitted herewith as incorporated by references.

A description of the preferred embodiments of the invention follows. The following characteristic equation of a rotating shaft for elastodynamics, thermoelastodynamics and viscoelastodynamics can be derived from the displacement fields for a material of continuum indicated by the subscript m, as cited from the references above are:

$$\begin{bmatrix} \frac{u_{rm}}{\cos n(\theta - \theta_0)} \\ \frac{u_{\theta m}}{\sin n(\theta - \theta_0)} \\ \frac{u_{zm}}{\cos n(\theta - \theta_0)} \end{bmatrix} = [umJ_n(r)][umY_n(r)] \begin{bmatrix} \begin{bmatrix} A_{1m} \\ A_{2m} \\ A_{3m} \end{bmatrix} \\ \begin{bmatrix} B_{1m} \\ B_{2m} \\ B_{3m} \end{bmatrix} \end{bmatrix} e^{i(kz-\omega t)} \quad (3)$$

where k is the wave number in the axial direction of the rotating shaft; $\omega$ is the frequency; $u_{rm}$, $u_{\theta m}$, and $u_{zm}$ are components of the displacement vector or velocity vector depending on the type of material in the r, $\theta$, and z directions; $A_{1m}$, $A_{2m}$, $A_{3m}$, $B_{1m}$, $B_{2m}$, $B_{3m}$ are arbitrary constants; n and $\theta$ are numbers related to the type of motion which will be discussed immediately. $[u_m J_n(r)]$, $[u_m Y_n(r)]$ are 3×3 matrices of Besel functions named here as "displacement matrices". The form of these matrices are $$[umJ_n(r)] = \begin{bmatrix} P_{dm} J'_n(P_{dm}r) & k_{sm}^2 \frac{n}{r} J_n(P_{sm}r) & ikP_{sm} J'_n(P_{sm}r) \\ -\frac{n}{r} J_n(P_{dm}r) & -k_{sm}^2 P_{sm} J'_n(P_{sm}r) & -ik\frac{n}{r} J_n(P_{sm}r) \\ ik J_n(P_{dm}r) & 0 & (k_{sm}^2 - k^2) J_n(P_{sm}r) \end{bmatrix} \quad (4)$$

$$[umY_n(r)] = \begin{bmatrix} P_{dm} Y'_n(P_{dm}r) & ' & ' \\ ' & ' & ' \\ ' & ' & (k_{sm}^2 - k^2) Y_n(P_{sm}r) \end{bmatrix} \quad (5)$$

The pertinent stress fields are:

$$\begin{bmatrix} \frac{u_{rm}}{\cos n(\theta - \theta_0)} \\ \frac{u_{\theta m}}{\sin n(\theta - \theta_0)} \\ \frac{u_{zm}}{\cos n(\theta - \theta_0)} \end{bmatrix} = [[umJ_n(r)][umY_n(r)]] \begin{bmatrix} \begin{bmatrix} A_{1m} \\ A_{2m} \\ A_{3m} \end{bmatrix} \\ \begin{bmatrix} B_{1m} \\ B_{2m} \\ B_{3m} \end{bmatrix} \end{bmatrix} e^{i(kz-\omega t)} \quad (6)$$

where $\sigma_{rrm}$, $\sigma_{r\theta m}$, and $\sigma_{rzm}$ are components of the stress tensor in the rr, r$\theta$ and rz directions, respectively, corresponding to the material of continuum as elastic or viscoelastic materials distinguished by the subscript m; and $[\sigma_m J_n(r)]$ and $[\sigma_m Y_n(r)]$ are 3×3 matrices of Bessel functions of the first and second kind named here as "stress matrices" after the subscript $\sigma$ The form of these matrices is $$\left[\frac{\sigma_m J_n(r)}{2\mu_m}\right] = \begin{bmatrix} \left[-\frac{\lambda'_m}{2\mu_m}k_{sm}^2 J_n(P_{dm}r) + P_{dm}^2 J''_n(P_{dm}r)\right] & nk_{sm}^2 P_{sm}^2\left(\frac{J_n(P_{sm}r)}{r}\right)' & ikP_{sm}J''_n(P_{sm}r) \\ -\frac{n}{2}\left[rP_{dm}\left(\frac{J_n(P_{dm}r)}{r^2}\right)' + \frac{P_{dm}}{r}J'_n(P_{dm}r)\right] & \frac{k_{sm}^2}{2}\left[\frac{n^2 J_n(P_{sm}r)}{r^2} + rP_{sm}^2\left(\frac{J'_n(P_{sm}r)}{r^2}\right)'\right] & \frac{-ikn}{2}\left[rP_{sm}\left(\frac{J'_n(P_{sm}r)}{r^2}\right) + P_{sm}\frac{J'_n(P_{sm}r)}{r^2}\right] \\ ikP_{dm}J'_m(P_{dm}r) & iknk_{sm}^2\frac{J_n(P_{sm}r)}{2r} & 1/2(k'_{sm}-2k^2)P_{sm}J'_n(P_{sm}r) \end{bmatrix} \quad (7)$$

The stress matrix $\sigma_m Y_n(r)$ is in the same form as equation (7). It can be obtained by replacing the symbol J for Y.

$$\left[\frac{\sigma_m Y_n(r)}{2\mu_m}\right] = \begin{bmatrix} \cdots \\ \cdots \\ \cdots \end{bmatrix} \quad (8)$$

where $$P_{dm}=(k_{dm}^2-k^2)^{1/2} \quad (9)$$

$$P_{sm}=(k_{sm}^2-k^2)^{1/2} \quad (10)$$

$c^2_{dm}$ and $c^2_{sm}$ define the material properties which can be obtained from Table No. 4 of Appendix C. For example, m=2 represents elastic material. $c_{d2}$ is the dilatational wave speed of a elastic solid and $c_{s2}$ is the shear wave speed in the same elastic solid.

The rotating shaft under consideration is a circular cylindrical shell of inner radius $a_1$ and of outer radius $a_2$. The boundary conditions on the surface $r=a_1$ and the surface $r=a_2$ are such that all stresses on these two surfaces are free from tractions, thus $$\sigma_{rr2}(r=a_1,\theta,z,t)=0 \quad (11)$$

$$\sigma_{r\theta2}(r=a_1,\theta,z,t)=0 \quad (12)$$

$$\sigma_{rz2}(r=a_1,\theta,z,t)=0 \quad (13)$$

$$\sigma_{rr2}(r=a_2,\theta,z,t)=0 \quad (14)$$

$$\sigma_{r\theta2}(r=a_2,\theta,z,t)=0 \quad (15)$$

$$\sigma_{rz2}(r=a_2,\theta,z,t)=0 \quad (13)$$

These boundary conditions lead to the following characteristic equation of the rotating shaft as:

$$\begin{vmatrix} [\sigma_m J_n(a_1)] & [\sigma_m Y_n(a_1)] \\ [\sigma_m J_n(a_2)] & [\sigma_m Y_n(a_2)] \end{vmatrix} = 0 \quad (17)$$

Equation (17) is a 6×6 determinant where the matrices and each element in the matrices are clearly defined from equations (7) and (8). As mentioned before, the choices of n and θ affect the physical meaning and the form of the displacement matrices (4), (5) and the stress matrices (7), (8) as well as the characteristic equation (17):

In the case of circumferential motion, $\theta_o=0$, $n\neq 0$ which includes n=1 as the transversal motion of the rotating shaft, $u_{rm}\neq u_{\theta m}\neq 0$. In the case of axially symmetric compressional wave motion, first let $\theta_0=0$, then let n=0. The results are that $u_{rm}\neq 0$, $u\theta_m=0$, $u_{zm}\neq 0$. In the case of axially symmetric torsional wave motion, first let $n\theta_0=\pi/2$, then let n=0. The results are that $u_{rm}=0$, $u_{\theta m}\neq 0$, $u_{zm}=0$.

Notice that the characteristic equation (17) is good for any linear viscoelastic materials including Newtonian fluids and elastic solids as they were defined by Wong in Appendices B-C. The derivation of characteristic equations for multi-layered shells can also be obtained by using equations (4), (5), (7), and (8) by matching the continuity of displacements and stresses at the intersurface between two different materials: for example, the characteristic equation of a two layered circular cylindrical shell in circumferential wave motion will be a 12×12 determinant; three layered, 18×18 determinant; four layered, 24×24 determinant, etc.

Given all the parameters of geometry and physics of the shaft, the critical frequencies can be calculated from the characteristic equation for given values of k and n. In particular, when k=π/l and n=1, the critical frequencies from the lowest mode to the highest mode represent the shaft in transversal motions. If the shaft is excited by a periodic force with frequencies that can be synchronized with one of those critical frequencies in a finite interval of time, the shaft will be broken in this particular frequency. According to the characteristic equation and its wave spectra analysis obtained from the computing program, there is an infinite number of critical frequencies for a rotating shaft. The shaft should be operated to avoid any one of those critical frequencies.

The most important criterion for the design of a rotating shaft of turbines, compressors, rotors and other rotary machines is to enable the system to run in a wide range of rotation speeds between any two critical speeds that are widely apart. To achieve this goal, the frequency spectra analysis of solid and hollow elastic shaft based upon the exact theory of elastodynamics is necessary. This was done and the numerical values can be obtained from the computing programs in Gazis, D. C., "Three-Dimensional Investigation of the Propagation of Waves in Hollow Circular Cylinders I: Analytical Foundation, and II: Numerical Results, Jr. Ac. Soc. Amer., Vol 31, pp. 568–578 (1959); Greenspon, J. E., "Vibration of a Thick-walled Cylindrical Shell—Comparison of the Exact Theory with Approximate Theories.", Jr. Ac. Soc. Amer., Vol 32, pp. 571–578 (1960), and Wong, P. K., "On the Unified General Solution of Linear Wave Motions of Thermoelastodynamics and Hydrodynamics with Practical Examples." Transaction of ASME, Journal of Applied Mechanics, Vol 34, pp. 879–887 (December 1967) and Vol. 35, pp 847 (December 1968). The program in Wong, P. K., "On the Unified General Solution of Linear Wave Motions of Thermoelastodynamics and Hydrodynamics with Practical Examples." Transaction of ASME, Journal of Applied Mechanics, Vol 34, pp.879–887 (December 1967) and Vol. 35, pp 847 (December 1968), Appendix B, can be used to provide the spectra analysis for multilayered spherical and circular cylindrical solids and shells of elastic materials.

Although further analysis should be continued to make a precise description for the particular choice type of shafts for a rotating system, however, based on the spectra analysis from the exact theory, the general rules are as follows:

1. For a solid shaft, the widest range of operating frequencies are those between zero to the first critical frequency for transversal (n=1) and circumferential (n=2, 3, 4, 5 . . .) vibrational modes.
2. For a shaft in the form of a moderate thick shell, the widest range of operating frequencies are between the first critical frequency and the second critical frequency for transversal (n=1) and circumferential (n>1) vibrational modes.
3. For a shell in the form of a thin shell, the widest range of operating frequencies are between the second critical frequency and the third critical frequency for transversal (n=1) and for circumferential (n>1) vibrational modes. As indicated from the spectra analysis of Wong, P. K., "On the Unified General Solution of Linear Wave Motions of Thermoelastodynamics and Hydrodynamics with Practical Examples." Transaction of ASME, Journal of Applied Mechanics, Vol 34, pp. 879–887 (December 1967) and Vol. 35, pp 847 (December 1968), the third and subsequent higher critical frequencies represent the thickness stretched vibration of the thin shell wall.

From these results, one can conclude that the best choice of a rotating shaft should be in the form of a hollow thin circular cylindrical shell. Thus the turbine and compressor system can be run in a wide range of speeds between the second and third critical frequencies of the shaft for all circumferential modes (n=0, 1, 2, 3, 4, 5, 6, 7 . . . ) which includes axially symmetric torsional and nontorsional (n=0), transversal (n=1), and other circumferential modes (n>1).

It should be noted that the circular cylindrical shells and solid shaft frequency spectra behave similarly as those of spherical shells and solid sphere as shown by FIG. 5, 6, 7.

What is claimed is:

1. A method for specifying cross-sectional dimensions of a high speed viscoelastic shaft having a circularly cylindrical cross-sectional shell, the shell having an inner radius and an outer radius, comprising the steps of:

selecting the material of the shaft;
   determining dilational wave speed of the material as a function of frequency;
   determining shear wave speed of the material as a function of frequency;
   solving for critical frequencies of the shaft by solving a three-dimensional characteristic frequency equation for the shaft, the equation being defined by the dilational wave speed, the shear wave speed, and the inner and outer radius of the shell, the critical frequencies defining functions that depend upon physical dimensions of the inner and outer radius; and
   specifying the inner and outer radius of the shell by minimizing cross-over of critical frequencies over operational rotational speeds of the shaft.

2. A method according to claim 1, wherein the step of solving for critical frequencies comprises utilizing a characteristic frequency equation having the following form:

$$\begin{vmatrix} [\sigma_m J_n(a_1)] & [\sigma_m Y_n(a_1)] \\ [\sigma_m J_n(a_2)] & [\sigma_m Y_n(a_2)] \end{vmatrix} = 0$$

where $\sigma_m$ represents a 3×3 stress matrix for linear viscoelastic material m, J corresponds to the Bessel's Function of the first kind, Y corresponds to the Bessel's Function of the second kind, $a_1$ corresponds to the inner radius of the shaft, and $a_2$ corresponds to the outer radius of the shaft.

3. A method according to claim 2, further comprising the step of utilizing a first stress matrix having the following form:

$$\left[\frac{\sigma m J_n(r)}{2\mu_m}\right] = -\frac{n}{2}\begin{bmatrix} \left[-\frac{\lambda'_m}{2\mu m}k^2_{sm}J_n(P_{dm}r) + P^2_{dm}J''_n(P_{dm}r)\right] & nk^2_{sm}P_{sm}\left(\frac{J_n(P_{sm}r)}{r}\right)' & ikP_{sm}J''_n(P_{sm}r) \\ \left[rP_{dm}\left(\frac{J_n(P_{dm}r)}{r^2}\right)' + \frac{P_{dm}}{r}J'_n(P_{dm}r)\right] & \frac{k^2_{sm}}{2}\left[\frac{n^2 J_n(P_{sm}r)}{r^2} + rP^2_{sm}\left(\frac{J'_n(P_{sm}r)}{r^2}\right)'\right] & \frac{-ikn}{2}\left[rP_{sm}\left(\frac{J'_n(P_{sm}r)}{r^2}\right) + P_{sm}\frac{J'_n(P_{sm}r)}{r^2}\right] \\ ikP_{dm}J'_m(P_{dm}r) & iknk^2_{sm}\frac{J_n(P_{sm}r)}{2r} & 1/2(k^2_{sm} - 2k^2)P_{sm}J'_n(P_{sm}r) \end{bmatrix}$$

the first stress matrix being finite at a center of the shell.

4. A method according to claim 3, further comprising the step of utilizing a second stress matrix having a form substantially similar to the form of the first stress matrix and having J replaced by Y in accord with:

$$\left[\frac{\sigma m Y_n(r)}{2\mu_m}\right] = \begin{bmatrix} \cdots \\ \cdots \\ \cdots \end{bmatrix}$$

the second stress matrix being indeterminate at the center of the shell.

5. A method for specifying cross-sectional dimensions of a high speed viscoelastic shaft having a circularly cylindrical cross-sectional shell, the shell having an inner radius and an outer radius, and an inner material disposed within the shell, comprising the steps of:

selecting a shaft material and the inner material;
   determining dilational wave speed of the shaft material as a function of frequency;
   determining shear wave speed of the shaft material as a function of frequency;
   determining dilational wave speed of the inner material as a function of frequency;
   determining shear wave speed of the inner material as a function of frequency;
   solving for critical frequencies of the shaft by solving a three-dimensional characteristic frequency equation for the shaft, the equation being defined by the dilational wave speeds of the shaft and inner materials, the shear wave speeds of the shaft and inner materials, and the inner and outer radius of the shell, the critical frequencies defining functions that depend upon physical dimensions of the inner and outer radius; and
   specifying the inner and outer radius of the shell by minimizing cross-over of critical frequencies over operational rotational speeds of the shaft.

* * * * *